United States Patent [19]

Parkinson et al.

[11] Patent Number: 5,430,379
[45] Date of Patent: Jul. 4, 1995

[54] CONDUCTOR LOCATOR ADAPTER FOR ELECTRONIC MARKERS

[75] Inventors: Timothy A. Parkinson; Ziyad H. Doany, both of Austin, Tex.

[73] Assignee: Minnesota Mining and Manufacturing Company, St. Paul, Minn.

[21] Appl. No.: 113,220

[22] Filed: Aug. 27, 1993

[51] Int. Cl.⁶ ............... G01V 3/08; G01V 3/12; G01V 3/15
[52] U.S. Cl. .................. 324/329; 324/67
[58] Field of Search ............. 324/67, 326, 329; 340/551, 572

[56] References Cited

U.S. PATENT DOCUMENTS

| | | | |
|---|---|---|---|
| 2,252,059 | 8/1941 | Barth | 175/182 |
| 2,921,179 | 1/1960 | Anderson | 219/125 |
| 3,617,865 | 11/1971 | Hakata | 324/3 |
| 3,729,675 | 4/1973 | Vosteen | 324/72 |
| 3,860,866 | 1/1975 | Dornberger | 324/52 |
| 3,889,179 | 6/1975 | Cutler | 324/3 |
| 3,988,663 | 10/1976 | Slough et al. | 324/3 |
| 4,091,322 | 5/1978 | Stankoff | 324/3 |
| 4,119,908 | 10/1978 | Cosman et al. | 324/3 |
| 4,134,061 | 1/1979 | Gudgel | 324/54 |
| 4,220,913 | 9/1980 | Howell et al. | 324/52 |
| 4,295,095 | 10/1981 | Thomas et al. | 324/326 |
| 4,387,340 | 6/1983 | Peterman | 324/326 |
| 4,390,836 | 6/1983 | Bruce et al. | 324/54 |
| 4,427,942 | 1/1984 | Sole | 324/326 |
| 4,438,389 | 3/1984 | De Sa | 324/52 |
| 4,458,204 | 7/1984 | Weber | 324/326 |
| 4,520,317 | 5/1985 | Peterman | 324/326 |
| 4,542,344 | 9/1985 | Darilek et al. | 324/326 |
| 4,639,674 | 1/1987 | Rippingdale | 324/326 |
| 4,665,369 | 5/1987 | Faller et al. | 324/326 |
| 4,672,321 | 6/1987 | Howell | 324/326 |
| 4,686,454 | 8/1987 | Pecukonis | 324/67 |
| 4,767,237 | 8/1988 | Cosman et al. | 405/157 |
| 4,843,324 | 6/1989 | Humphreys, Jr. et al. | 324/326 |
| 4,866,388 | 9/1989 | Cosman et al. | 324/326 |
| 4,942,365 | 7/1990 | Satterwhite | 328/134 |
| 4,990,852 | 2/1991 | Kirkland | 324/326 |
| 5,001,430 | 3/1991 | Peterman et al. | 324/326 |
| 5,045,368 | 9/1991 | Cosman et al. | 324/326 X |
| 5,093,622 | 3/1992 | Balkman | 324/326 |
| 5,264,795 | 11/1993 | Rider | 324/326 |

*Primary Examiner*—Sandra L. O'Shea
*Assistant Examiner*—Roger C. Phillips
*Attorney, Agent, or Firm*—Gary L. Griswold; Walter N. Kirn; Jack V. Musgrove

[57] ABSTRACT

An adapter for a conventional conductor locator allows the locator to additionally detect the presence of passive, electronic markers. The adapter includes an electronic marker locator and a wireless interface housed in a common body which may be releasably attached to the conductor locator. The electronic marker locator, which may comprise conventional circuitry, outputs a marker detection signal to the wireless interface, which conditions the signal so that it is compatible with the input sensor of the conductor locator. The wireless interface includes an output antenna which is positioned adjacent the input sensor of the conductor locator when the adapter is attached thereto. If the conductor locator is of the type which may receive test signals at different operating frequencies, then the wireless interface also includes a modulator to selectively convert the marker detection signal to one of these operating frequencies. The electronic marker locator portion of the adapter may also be selectively adjusted to detect different discrete marker frequencies. The adapter may operate in a sleep mode, wherein the output signal of the wireless interface is disabled, but the wireless interface may still alert the user to the presence of an electronic marker by an audible alarm.

20 Claims, 3 Drawing Sheets

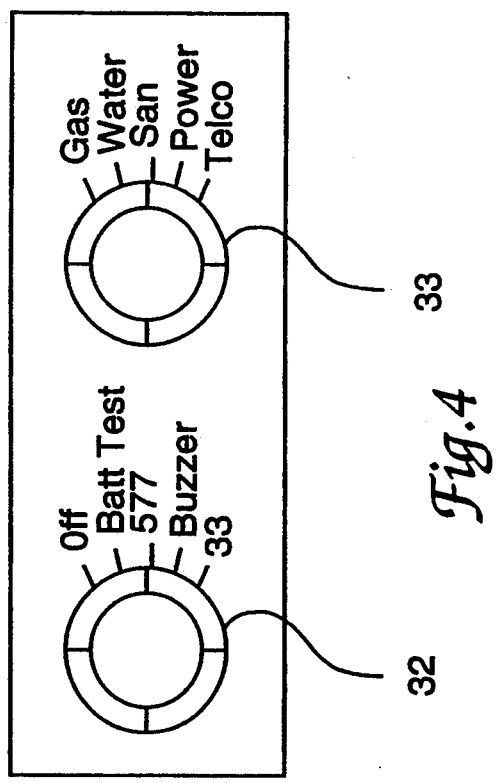
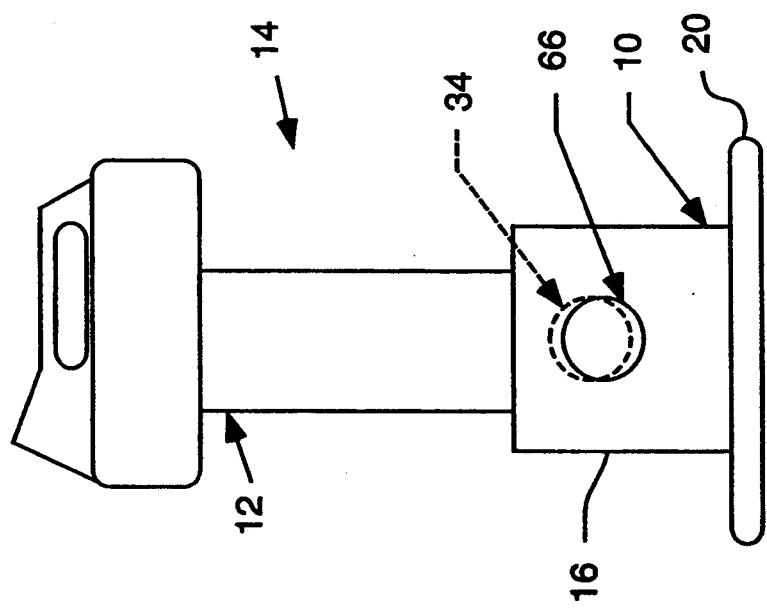

CONDUCTOR LOCATOR ADAPTER FOR ELECTRONIC MARKERS

BACKGROUND OF THE INVENTION

1. Field of the Invention

The present invention generally relates to the detection and location of obscured electrical conductors, and more particularly to an apparatus which adapts a conductor locator to be able to additionally detect passive resonant electronic markers.

2. Description of the Prior Art

Buried conduits are employed for supplying a wide variety of utilities, including pipelines for gas, water and sewage, and cables for telephone, power and television. It often becomes necessary to locate defective or damaged cables, pipes, etc., in order to repair or replace them. Conversely, it is important to know the approximate vicinity of such items in order to avoid disturbing them when digging or excavating for other purposes.

There are two primary techniques for location of such obscured conduits. The first requires that the conduit have (or be) a continuous electrical conductor along its length, such as telephone, power and television cables which not only have the copper conductors used to transmit the signal or power, but also typically have a ground shield surrounding the cable. The second technique, which may be used on pipes (such as gas and water mains) which do not have such a continuous conductor, requires the previous placement of an electronic marker(s) adjacent the conduit during its burial.

In the first of these techniques, a test signal (alternating current) is applied, directly or inductively, to the conductor, which then acts as an antenna and radiates the test signal along the length of the conduit. A locating apparatus is then used to detect the presence of the test signal, and the locator may further process the signal to determine the lateral direction to the conductor, and its depth. The earliest cable locators use a single sensor which detects a single null or peak (depending upon the orientation of the sensor) as the unit passes near the cable. Many later devices use two or more sensors that combine the signals to provide an indication of conductor proximity. The most common sensors are ferrite-core antennas, i.e., inductors. Several prior art locators are described in the following patents:

| U.S. Pat. Nos. | |
| --- | --- |
| 3,617,865 | 4,438,389 |
| 3,860,866 | 4,542,344 |
| 3,889,179 | 4,520,317 |
| 3,988,663 | 4,639,674 |
| 4,091,322 | 4,665,369 |
| 4,134,061 | 4,672,321 |
| 4,220,913 | 4,686,454 |
| 4,295,095 | 4,843,324 |
| 4,387,340 | 5,001,430 |
| 4,390,836 | 5,093,622 |
| 4,427,942 | |

In the second technique, the electronic markers may be active (e.g., have a battery to supply the signal), but passive markers are more common, having a capacitor and wire coil forming a resonant LC circuit. A given marker has only a single frequency (bandwidth centerline) which is hard-wired, and whose value depends upon the capacitance and inductance of the circuit. A transceiver having a radiating antenna and a pick-up antenna is used to detect passive markers. The radiating antenna intermittently outputs a signal having a frequency tuned to energize the marker. If there is a marker of the appropriate frequency within the vicinity of the transceiver, it absorbs a portion of the signal and re-radiates it. During the periods between signal output by the transceiver, the pick-up antenna listens for any re-radiated signal, and notifies the user if one is found, and usually provides an indication of signal strength. Several prior art markers are described in the following patents:

| U.S. Pat. Nos. | |
| --- | --- |
| 3,836,842 | 4,873,533 |
| 4,334,227 | 4,947,012 |
| 4,712,094 | 5,017,415 |
| 4,761,656 | 5,045,368 |

Generally speaking, the methods used by the locators' circuitry differ depending on whether a conductor or a marker is being searched for. Nevertheless, there are hybrid systems wherein a signal is applied to a buried conductor, and coupled through the conductor to one or more markers buried adjacent the conductor. See, e.g., U.S. Pat. No. 4,119,908, 4,767,237 and 4,862,088. Also, in U.S. Pat. No. 4,866,388, a marker is used to couple one conductor to another, so that the test signal may be conveyed to the second conductor without a direct connection.

There are several difficulties, however, in attempting to combine conductor and marker locators. First of all, most passive electronic markers are environmentally sealed (electrically insulated) and so cannot be activated by application of an alternating current, i.e., they are not connected to a conductor that runs the length of the conduit. Indeed, markers are often specifically used to avoid the presence of a continuous conductor along the conduit, such as in natural gas distribution where a lightning strike could progress down such a conductor and ignite a leak. The passive, isolated nature of the markers presents a problem since most conductor locators do not themselves transmit any signal which could be re-radiated by the marker. Of course, the marker could be modified to allow direct physical connection to the conductor, as described in U.S. Pat. No. 4,862,088. In that system, a marker locator may be placed at any point (above ground) along a cable having a metallic screen which is coupled to a resonant marker. This system is undesirable, however, since it requires significant modification to the marker design, adding cost, and it requires more time and effort in installation; furthermore, it cannot be used to trace conductors which are not coupled to resonant circuits. It would also be very difficult to use this device with certain improved marker designs, such as the ball marker shown in U.S. Pat. No. 4,712,094, since that marker is designed for movement relative to the conduit (which would break the electrical connection in the '088 device), and the marker body is filled with water.

The primary limitation, however, in such a combination of marker and conductor locators relates to the frequency conventions used to identify different markers associated with different types of utilities. Five distinct frequencies have been designated: 83.0 kHz for gas; 101.4 kHz for telephone; 121.6 kHz for sewage; 145.7 kHz for water; and 169.8 kHz for power (the markers are also usually color-coded). In this manner, a service technician searching for, say, a gas line, cannot accidentally activate a telephone marker since his transmitter will only be sending out an 83 kHz signal, which is outside the bandwidth of a telephone marker tuned for 101.4 kHz. Of course, these frequencies have been designated by convention, and they should not be construed in a limiting sense with respect to the present invention.

The problem, then, is that the same signal induced on the conductor cannot be used to activate the marker unless it is at the appropriate frequency. This is compounded by the fact that most conductor locators use two frequencies (577 Hz or 33 kHz) other than those used with markers. Therefore, conventional conductor locators (even if they were adapted to send a downward signal) would still not detect most markers since the markers would be tuned to the wrong frequency. Markers may be provided which respond to more than one frequency, but they cost more and may lead to false locates when searching for a different type of utility from that found. In U.S. Pat. Nos. 4,119,908, 4,866,388 and 4,767,237, a single locator is used for both conductor and marker location, but the locator can only detect conductors which radiate the signal tuned to the specific frequency of the marker, i.e., the locator requires a (separate) transmitter which is tunable to each frequency in the family of markers which are desired to be locatable. This adds great expense, particularly for users who only want conductor, and not marker, locating ability. It would, therefore, be desirable to devise an apparatus which would allow for the detection of both markers and conductors, and yet not require modification of the basic conductor locator or the marker design. It would further be advantageous if the device could detect both structures simultaneously.

SUMMARY OF THE INVENTION

The present invention provides an adapter for a conductor locator generally comprising an electronic marker locator and an interface which transmits a modified signal, based on a detected electronic marker, to the input of a conductor locator. The interface is preferably wireless. The circuitry of the electronic marker locator may be that of a conventional locator for passive resonant markers, allowing for multiple, discrete frequency settings. The normal output of the marker locator (an electronic signal indicating the absolute or relative strength of the detected marker's proximity) is modified by the wireless interface to provide an output which is compatible with the conductor locator input, and which preferably retains information on both absolute and relative strength. A conventional conductor locator may then be used in a marker locator mode.

The electronic marker locator and wireless interface are preferably housed in a single body having a suitable shape and size for physical attachment to the conductor locator, and most preferably positioning the output antenna of the wireless interface adjacent to the input antenna of the conductor locator. The adapter is releasably attached to the conductor locator at a location which facilitates hand-held manipulation of the combined adapter/locator.

The wireless interface may further be designed to provide full compatibility with the input options of the conductor locator, e.g., the ability to provide an output signal at different frequencies, based on different optional input frequencies of the conductor locator. The adapter body ideally houses a portable power supply (battery) for the electronic marker locator and wireless interface. Thus, the combined adapter/locator can switch between marker mode and conductor mode by simply turning off the adapter. The adapter can optionally have a sleep mode wherein the wireless interface is partially disabled, but the electronic marker locator remains turned on and activates an alarm (preferably audible), to alert the user that a marker is nearby.

BRIEF DESCRIPTION OF THE DRAWINGS

The novel features and scope of the invention are set forth in the appended claims. The invention itself, however, will best be understood by reference to the accompanying drawings, wherein:

FIG. 2 is a side elevational view of the adapter/locator system of the present invention; FIG. 4 is a plan view of a control panel which may be used with the adapter of the present invention.

DESCRIPTION OF THE PREFERRED EMBODIMENT

Figure 1:
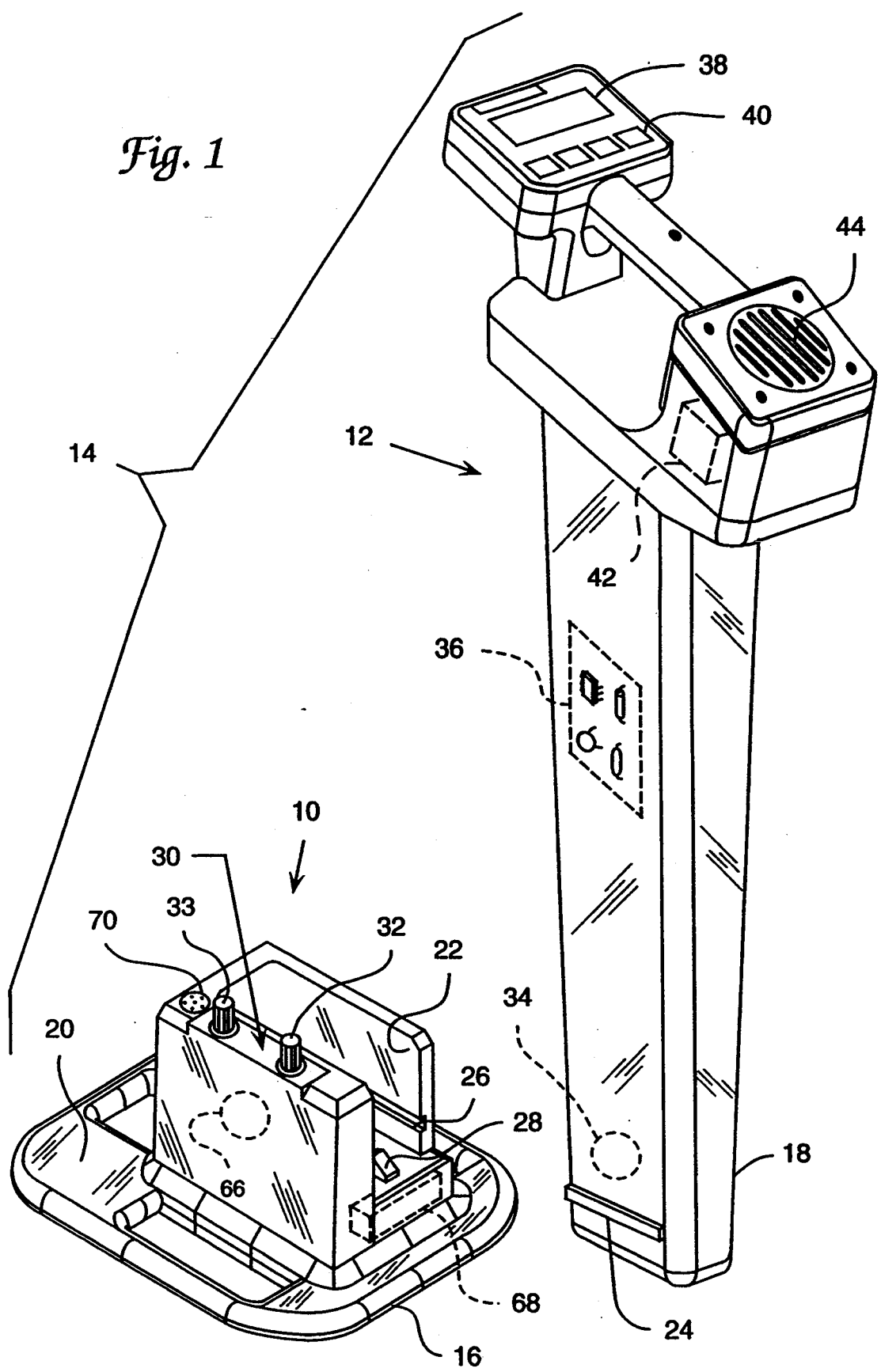
FIG. 1 is a perspective of a conventional conductor locator alongside one embodiment of the adapter of the present invention designed to be compatible with the conductor locator.

With reference now to the figures, and in particular with reference to FIGS. 1 and 2, there is depicted one embodiment 10 of the marker locating adapter of the present invention, alongside a conventional conductor locator 12; together, they form a marker/conductor locating system 14. The adapter of the present invention may be designed to be compatible with a wide variety of conventional locators, so it is understood that adapter 10 is merely one embodiment selected for the particular locator 12 depicted. Locator 12 is essentially that described in U.S. patent application Ser. No. 08/011,383 filed Jan. 29, 1993, and is also similar to the locator shown in U.S. Pat. No. 5,093,622.

Adapter 10 has a body 16 which is generally shaped to conform to the antenna portion 18 of locator 12. Body 16 may be constructed of any durable material, preferably a polymer such as the polycarbonate/polyester blend sold by General Electric Co. under the trademark XENOY. In the preferred embodiment, body 16 has a foot portion 20 and a slot or cavity 22 to receive antenna portion 18 of locator 12. Foot 20 allows the combined adapter/locator 14 to stand upright in a stable position, and also houses the transmit and receive antennas described further below. Adapter 10 is attached to antenna portion 18 by any convenient means; in the preferred embodiment, rails or splines 24 are formed on antenna portion 18, and are slidably received in grooves 26 formed on the inside walls of cavity 22. A spring loaded button or lever 28 releasably secures antenna portion 18 in cavity 22. Of course, adapter 10 could be permanently attached to conductor locator 12 without impairing its functionality, except to slightly increase its overall size and weight. Adapter 10 also has a control panel 30 with one or more switches or knobs 32 and 33 as explained further below.

Locator 12 has one or more spatially oriented sensors 34 connected to signal processing circuitry 36. In the '383 locator, the sensor comprises a pair of magnetic-field induction coils, although it is conceivable that the present invention could also be modified for use with electric-field capacitive plates. Sensor 34 detects the electromagnetic signal generated by an alternating current in the conductor to be located, e.g., a telephone, television or power cable. Current (at a known frequency such as 577 Hz or 33 kHz) may be placed on the conductor directly or inductively by a conventional transmitter unit (not shown). Circuitry 36, which supplies an output signal to indicator 38, is controlled via a keypad 40, and is preferably powered by a portable source, i.e., a battery 42. The output signal may contain information about the absolute and relative strength of any base signal detected by the sensor(s). In such case, that information is displayed on indicator 38. Information may also be displayed concerning conductor direction and depth. Locator 12 may also have a speaker 44 to provide an audible indication of signal strength.

Figure 3:
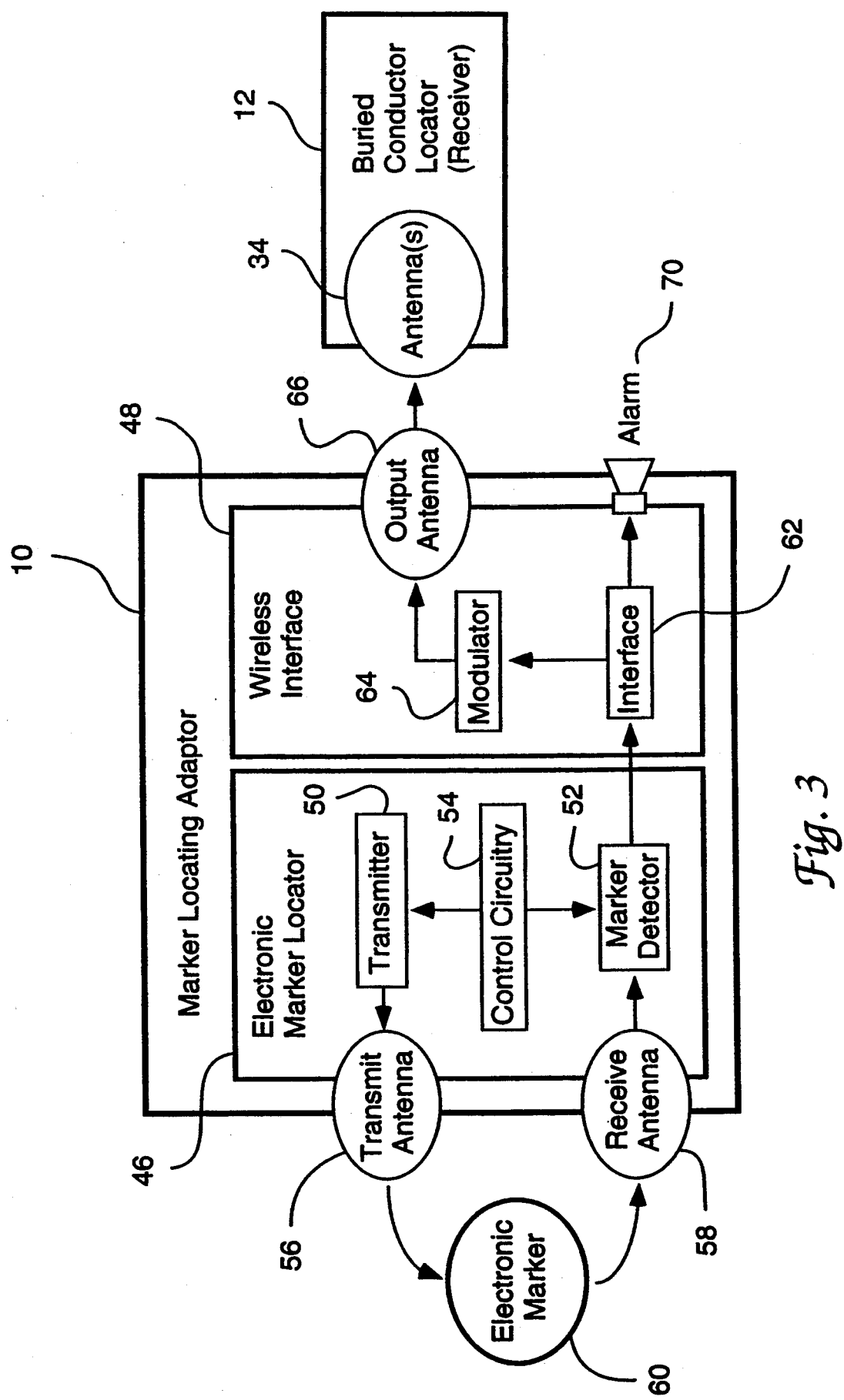
FIG. 3 is a block diagram depicting the electronic structure of one embodiment of the adapter of the present invention.

Referring now to FIG. 3, the electronic structure of adapter 10 generally comprises an electronic marker locator 46 and a wireless interface 48. The circuitry of electronic marker locator 46 may be that of a conventional marker locator for passive resonant markers, allowing for the detection of frequencies at 83.0, 101.4, 121.6, 145.7, and 169.8 kHz (see FIG. 4). Electronic marker locator 46 includes transmitter circuitry 50, marker detection circuitry 52, control circuitry 54, a transmit antenna 56, and a receive antenna 58, all conventional components. Those skilled in the art will appreciate that the transmit and receive antennas could be combined into a single antenna.

With further reference to FIG. 4, the operation of electronic marker locator 46 is controlled by knob 33 which, in the preferred embodiment, has five settings, one for each of the conventionally used utility frequencies. When adapter 10 is turned on (in marker locate or sleep mode), control circuitry 54 instructs transmitter 50 to send intermittent signals to transmit antenna 56, energizing any passive marker 60 in the vicinity. Receive antenna 58 (which is coaxially aligned with transmit antenna 56) then picks up the re-radiated signal from marker 60, and passes it to marker detector circuitry 52. Synchronization of the transmit and receive cycles of marker locator 46 is regulated by control circuitry 54.

In a conventional marker locator, the output of marker detector 52 would be sent to the display and/or speaker of the marker locator; however, in the present invention, it passes to wireless interface 48. Marker detector circuitry 52 is connected to interface circuitry 62 which conditions the output signal of marker locator 46 by filtering, compression, expansion, etc., as needed to provide compatibility with the input expected by sensor 34 of conductor locator 12. In the embodiment designed for use with the '383 device, interface circuitry 62 is a class A amplifier/driver with a bandpass filter which may be selectively adjusted to the desired output frequency. The output of interface circuitry 62 is translated to the operating frequency of sensor 34 (e.g., 577 Hz or 33 kHz) by a modulator 64. Modulator 64 is controlled by knob 32. The relative positions of modulator 64 and interface circuitry 62 may be reversed, and the modulator may even be incorporated into marker detector circuitry 52. In the preferred embodiment, modulator 64 is a quadrature mixer which may be set to any of the desired output frequencies (577 Hz, 33kHz, or an audible frequency of speaker 70, discussed below).

Modulator 64, in conjunction with an output antenna 66, creates an electromagnetic signal which is fully compatible with the input (sensor 34) of the conductor locator, and which can be interpreted by the user (with respect to signal strength) in a manner similar to that of true conductor signals. As such, it simplifies the location task for the craftsperson since very little training is required to use and understand adapter 10. An additional advantage is that conventional locator 12 does not require any modification, except possibly a minor modification such as the addition of means (e.g., splines 24) to assist in the attachment to adapter 10. Output antenna 66 is preferably positioned in body 16 of adapter 10 such that it is in direct alignment with sensor 34 of locator 12, to maximize coupling of the modulated signal. Antenna 66 and sensor 34 are shown slightly offset in FIG. 2 only for purposes of illustration. The axes of coils 34 and 66 are preferably not aligned with the axis of coil 56, and are most preferably orthogonal to the axis of coil 56, to minimize any possible interference. Coil 34 is also preferably located near the axial center of coil 56 for the same reason, since the output of coil 56 is a null near its axial center. Those skilled in the art will further appreciate, however, that the present invention could be modified to provide a direct electrical connection between interface 48 and locator 12, such as by providing a plug emanating from adapter 10 which mates with an external jack on locator 12, presuming that the locator has such a jack.

When a marker 60 is detected, adapter/locator 14 is swung from side to side while observing the indicated signal strength. In this manner, the operator can determine the location of the marker. When the operator wishes to locate only buried conductors carrying the test signal, adapter 10 is turned off.

Referring again to FIG. 4, it can be seen that knob 32 also has five settings. Two of these, labeled "577" and "33", are equivalent to "power on" settings, and additionally set the output frequency of modulator 64. The "off" setting completely disables adapter 10 by cutting power from a battery 68 within body 16 of adapter 10, while the "Batt. Test" setting would activate an audible alarm if the battery were low. Alternatively, adapter 10 could effectively be turned and off using keypad 40, by setting the output frequency of adapter 10 at a frequency different from that of the conductor test signal, and switching between these frequencies using keypad 40. The final setting, labeled "Buzzer" in FIG. 4, puts adapter 10 into a sleep mode, wherein modulator 64 is disabled, but the remaining components of adapter 10 are active. In this state, if a marker signal is detected above a predetermined threshold, interface circuitry 62 sends a special signal to an alarm, such as an audible speaker 70, alerting the operator that an electronic marker tuned to the selected frequency is nearby. The operator may then switch from sleep mode to marker locate mode and pinpoint the location of the electronic marker. It will also be appreciated that the sleep mode could operate without speaker 70, by coupling into speaker 44 of locator 12. For example, antenna 66 could output a special signal at all operating frequencies of locator 12, that would be heard through speaker 44 whenever the strength of the detected marker signal passes a predetermined threshold.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, while the present invention has been described with reference to the specific conductor locator disclosed in U.S. patent application Ser. No. 08/011,383, it is understood that the invention is equally applicable to other prior art locators, such as those identified in the Description of the Prior Art. It is therefore contemplated that such modifications can be made without departing from the spirit or scope of the present invention as defined in the appended claims.

We claim:

1. A device for adapting a conductor locator, having means for detecting the location of an obscured, continuous electrical conductor, to allow the conductor locator to additionally locate electronic markers, the device comprising:
   a body;
   means for attaching said body to the conductor locator;
   electronic marker locator means, located in said body, for detecting the presence of an electronic marker in the vicinity of the conductor locator; and
   interface means, located in said body, for providing an output signal to an input of the conductor locator, based on a signal radiated by the electronic marker, said output signal being generally compatible with the input of the conductor locator.

2. The device of claim 1 wherein:
   the input of the conductor locator comprises an antenna sensor; and
   said interface is wireless, electromagnetically transmitting said output signal to the antenna sensor.

3. The device of claim 1 wherein said output signal of said wireless interface means provides an indication of the strength of the signal radiated by the electronic marker.

4. The device of claim 1 wherein said electronic marker locator means may be tuned to one of a plurality of discrete frequency settings.

5. The device of claim 1 wherein said attaching means releasably attaches said body to the conductor locator.

6. The device of claim 1 wherein said wireless interface means includes modulator means for translating said output signal to an operating frequency of the conductor locator.

7. The device of claim 1 wherein the conductor locator is designed to selectively receive signals of different operating frequencies, and said wireless interface means includes:
   modulator means for translating said output signal to one of the different operating frequencies of the conductor locator; and
   switch means controlling said modulator means for selecting one of the different operating frequencies.

8. The device of claim 1 wherein said electronic marker locator means radiates a test signal at one of a plurality of discrete marker frequencies, and further comprising switch means controlling said electronic marker locator means, for selecting one of said discrete marker frequencies.

9. The device of claim 1 further comprising:
   switch means for disabling said output signal of said wireless interface means; and
   alarm means, connected to said wireless interface means, for indicating detection of the signal radiated by the electronic marker.

10. The device of claim 1 wherein:
    the conductor locator has a sensor;
    said wireless interface means has an output antenna for radiating said output signal; and
    said output antenna is adjacent said sensor when said body is attached to the conductor locator.

11. The device of claim 1 wherein said body includes foot means for supporting the conductor locator in an upright position.

12. An apparatus for adapting a conductor locator to allow it to additionally locate electronic markers, the conductor locator having an antenna portion housing at least one sensor for receiving a test signal radiated from a conductor, the apparatus comprising:
    a body;
    means for releasably attaching said body to the conductor locator;
    electronic marker locator means, located in said body, for detecting the presence of an electronic marker in the vicinity of the conductor locator; and
    wireless interface means, located in said body, for providing an output signal to an input of the conductor locator, based on a signal radiated by the electronic marker, said output signal being generally compatible with the sensor of the conductor locator, and said wireless interface means including an output antenna which radiates said output signal, said output antenna being located adjacent the conductor locator sensor when said body is attached to the conductor locator.

13. The apparatus of claim 12 wherein the conductor locator is designed to selectively receive signals of different operating frequencies, and said wireless interface means further includes:
    modulator means for translating said output signal to one of the different operating frequencies of the conductor locator; and
    switch means controlling said modulator means for selecting one of the different operating frequencies.

14. The apparatus of claim 12 further comprising:
    switch means for disabling said output signal of said wireless interface means; and
    alarm means, connected to said wireless interface means, for indicating detection of the signal radiated by the electronic marker.

15. The apparatus of claim 12 wherein:
    the sensor of the conductor locator has an axis; and
    said output antenna of said wireless interface has an axis which is generally aligned with the axis of the sensor when said body is attached to the conductor locator.

16. The apparatus of claim 13 wherein said electronic marker locator means radiates another test signal at one of a plurality of discrete marker frequencies, and further comprising switch means controlling said electronic marker locator means, for selecting one of said discrete marker frequencies.

17. A system for locating an obscured conductor which is proximate a passive, resonant, electronic marker, comprising:
    transmitter means for applying a first test signal to the obscured conductor;
    conductor locator means for detecting said test signal as it radiates from the conductor; and
    marker locator adapter means, releasably attached to said conductor locator means, for radiating a second test signal, detecting any re-radiation of said second test signal by the electronic marker, and providing an output signal to said conductor locator means if any re-radiation of said second test signal is detected.

18. The system of claim 17 wherein said conductor locator means has an antenna portion housing a sensor, and said marker locator adapter means includes:
   a body;
   electronic marker locator means, located in said body, for detecting the presence of the electronic marker, said electronic marker locator means including marker detector circuitry means for providing a marker signal indicative of the strength of the second test signal re-radiated by the electronic marker;
   wireless interface means, located in said body, for providing an output signal to an input of the conductor locator, based on said marker signal from said marker detector circuitry means, said output signal being generally compatible with said sensor of said conductor locator, and being radiated by an output antenna; and
   means for attaching said body to said conductor locator such that said output antenna of said wireless interface means is adjacent said sensor of said conductor locator.

19. The system of claim 8 wherein said marker locator adapter means includes:
   switch means for disabling said output signal of said wireless interface means; and
   alarm means, connected to said wireless interface means, for indicating detection of said second test signal re-radiated by the electronic marker.

20. The system of claim 18 wherein:
   said conductor locator means includes means for selectively receiving signals of different operating frequencies;
   said wireless interface means includes modulator means for translating said output signal to one of said different operating frequencies, and switch means controlling said modulator means for selecting one of said different operating frequencies;
   said electronic marker locator means further includes means for radiating said second test signal at one of a plurality of discrete marker frequencies, and switch means for selecting one of said discrete marker frequencies.

* * * * *